United States Patent [19]

Ito et al.

[11] 3,893,879

[45] July 8, 1975

[54] PROCESS FOR PRODUCING A PLASTIC CORRUGATED BOARD AND APPARATUS THEREFOR

[75] Inventors: Tadashi Ito; Nobuo Tsuru, both of Tokyo, Japan

[73] Assignee: Mitsui Toatsu Chemicals, Incorporated, Tokyo, Japan

[22] Filed: Oct. 22, 1971

[21] Appl. No.: 191,867

[52] U.S. Cl. ............... 156/164; 156/201; 156/210; 156/244; 156/285; 156/462; 156/471; 156/495; 156/497; 156/498; 156/500; 264/286
[51] Int. Cl. ..................... B29f 3/00; B31f 1/20
[58] Field of Search .......... 156/201, 205, 208, 210, 156/215, 244, 290, 311, 462, 470–472, 500, 494–495, 497–498, 164, 285; 264/286

[56] References Cited
UNITED STATES PATENTS

| | | | |
|---|---|---|---|
| 3,210,227 | 10/1965 | Shichman | 156/311 X |
| 3,462,332 | 8/1969 | Goto | 156/498 |
| 3,488,244 | 1/1970 | Lepisto | 156/311 |
| 3,673,032 | 6/1972 | Kimoly | 156/210 |
| 3,682,736 | 8/1972 | Akamatsu | 156/210 |
| 3,758,370 | 9/1973 | Sakurai et al. | 156/244 |
| 3,773,587 | 11/1973 | Flewwelling | 156/201 |

*Primary Examiner*—Charles E. Van Horn
*Assistant Examiner*—Basil J. Lewris
*Attorney, Agent, or Firm*—Fisher, Christen & Sabol

[57] ABSTRACT

A process for producing a plastic corrugated board and an apparatus therefor, wherein a molten thermoplastic resin is extruded through a flat die to form a flat sheet; the flat sheet thus extruded is then directed to a pair of opposed corrugate-surfaced rolls for passage of the sheet through a gap formed therebetween, after the temperature of said flat sheet has been adjusted by means of touch rolls, thereby forming a corrugated core sheet the configuration of said gap accomodating the cross-sectional configuration of the corrugated core sheet; a flat sheet of a thermoplastic resin extruded from another die is laid on said corrugated core sheet mounted on the corrugate-surfaced roll, and at the same time said flat sheet is press-adhered to the corrugated core sheet by cool air blown onto the joining portions thus forming a single-face corrugated board; the single-face corrugated board is then reversely mounted on a flat roll where a flat sheet of a thermoplastic resin extruded from still another die is laid on the corrugated core sheet of said single-face corrugated board so that the former may be pressed onto the latter for adhesion by cool air blown onto the joining portions thereof, thereby providing a double-face corrugated board; and then each of the two sides of the double-face corrugated board is cooled separately by means of a cooling means, thereby insuring flatness of said corrugated board.

10 Claims, 1 Drawing Figure

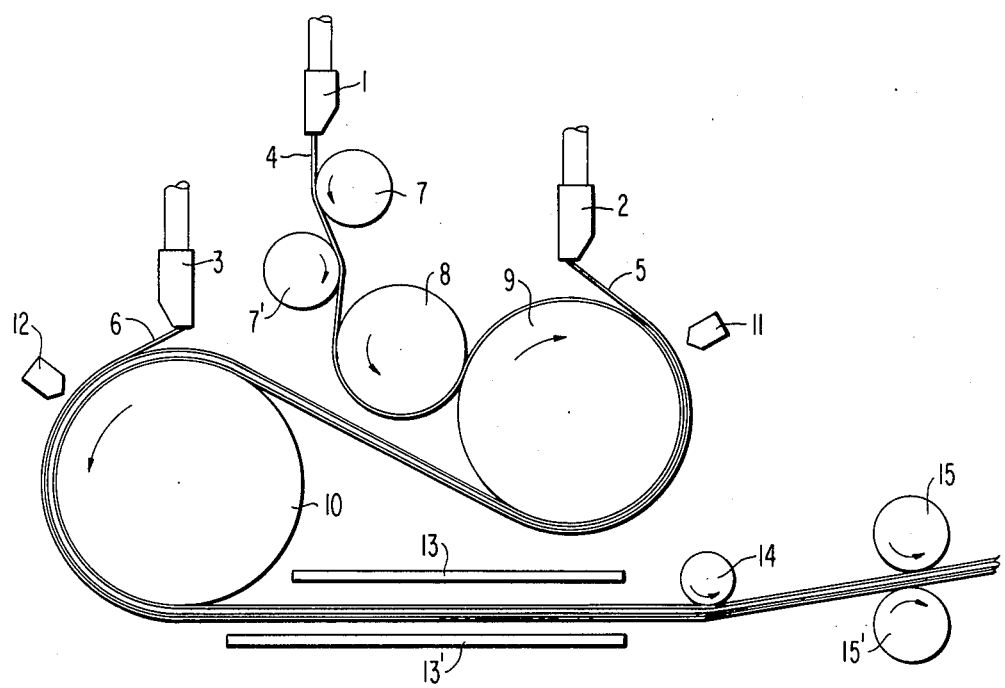

PROCESS FOR PRODUCING A PLASTIC CORRUGATED BOARD AND APPARATUS THEREFOR

BACKGROUND OF THE INVENTION

Single-face and double-face corrugated cardboard for use as packaging material is well known, in which one or two sheets of liner paper are adhered to one side or both sides of a corrugated core sheet. This invention relates to a precess for producing plastic corrugated board and an apparatus therefor wherein a thermoplastic synthetic resin is used as the material for a corrugated board.

The plastic corrugated board of the present invention has a corrugated core sheet, the direction of the corrugation being in parallel with the direction of the formed sheet being taken up.

Heretofore several processes have been proposed for producing a plastic corrugated board, such as an integral type forming process a profile type die (harmonica type die) is used, the cross-sectional shape of which accommodates the cross-sectional shape of the corrugated cardboard (Japanese Pat. Publication No. 12592/1967), a process for heat-adhering liners to a corrugated core sheet which has been formed by means of a profile type die (Japanese Pat. Publication Nos. 3833/1963 and 3427/1965) and a process for press and heat adhering liners onto both sides of a corrugated core sheet by means of a pair of press rolls, said core sheet having been formed by means of a pair of gear-shaped rolls arranged in a meshing relation with each other (Japanese Pat. Publication No. 16076/1966).

These known processes for extruding a thermoplastic resin through a profile type die suffer from disadvantages in that there is a tendency of the occurrence of a die swelling in a high-speed forming region, because of a greater lip resistance at the die and hence the types, compositions and forming conditions of the applicable thermoplastic resins are limited to some extent. For instance, where polyolefin susceptible to such die swelling is used, the forming speed should be extremely reduced, thereby impairing productivity.

In addition to this, when flat sheets, i.e., liners, are pressed together on both sides of the corrugated core sheet by means of press rolls for heat adhesion, the temperature of both sheets should be raised to obtain a satisfactory adhesion strength. However the temperature thus raised incurs difficulties in maintaining the corrugation configuration and pitch of the corrugated core sheet in the normal conditions. Furthermore, there is a tendency for unsatisfactory adhesion to take place on the lower surface thereof. Therefore, the above process would provide difficulties in producing plastic corrugated board having a proper shape and sufficient adhesion strength.

SUMMARY OF THE INVENTION

An object of the present invention is to overcome the disadvantages aforementioned and to provide a process and an apparatus therefor for producing a plastic corrugated board of excellent adhesion strength and well-regulated corrugation configuration. The process for producing a plastic corrugated board according to the present invention is characterized in that said process comprises the steps of extruding a thermoplastic resin to form a flat sheet; after the temperature thereof has been adjusted beforehand, passing the sheet through a gap formed between a pair of rolls having corrugated surfaces, thereby forming a corrugated core sheet, the direction of the corrugations extending in parallel with that of said sheet being drawn; while said corrugated core sheet is retained on the rolls having corrugated surfaces, laying thereon another flat sheet of a thermoplastic resin, said sheet being extruded separately; blowing cool air onto the joining portions thereof for press-adhering said joining portions together, thereby forming a single-face corrugated board; directing the single-face corrugated board onto a flat roll; laying thereon a flat sheet of thermoplastic resin which sheet is extruded separately; blowing cool air onto the joining portions thereof for press-adhering the joining portions together, thereby forming a double-face corrugated board; and cooling each of the two sides of said board separately.

BRIEF DESCRIPTION OF THE DRAWINGS

The FIGURE is a schematic flow chart of the steps for producing plastic corrugated board by means of the apparatus of the present invention.

DESCRIPTION OF THE PREFERRED EMBODIMENTS

Referring now to the drawing, the apparatus for producing the corrugated board shown there includes flat sheet dies 1, 2 and 3 each connected to extruders; touch rolls 7 and 7'; forming roll 8 having corrugated surfaces; face joining roll 9 having corrugated surfaces; a flat roll 10 for joining the other face; air blowing means 11 and 12; cooling means 13 and 13'; a guide roll 14; and pinch rolls 15 and 15'.

The flat dies 1, 2 and 3 are adapted to extrude a thermoplastic resin by means of an extruder to form a flat sheet and arranged to extrude said sheet downwardly. A sheet 4 extruded from flat sheet die 1 contacts the touch rolls 7 and 7' located immediately below flat die 1 and is then formed into a corrugated core sheet by means of rolls 8 and 9 having corrugated surfaces after the temperature of said sheet has been adjusted beforehand.

Touch rolls 7 and 7' are of a flat roll type and provided with a position shifting mechanism for varying the contact angle of flat sheet 4 and a heat medium circulating means for cooling, thereby functioning to adjust to a required range the temperature of the sheet 4 in contact with said circulating mechanism. Forming roll 8 having a corrugated surface and face joining roll 9 having a corrugated surface are provided with a plurality of grooves and ribs arranged in an axial direction, said grooves and ribs on each roll being located free of contact therebetween and the gap thus formed between said two rolls 8 and 9 being configured to accomodate the corrugation of the corrugated core sheet to be formed. The configuration of the corrugations may be of a conventional U- or V-shape or others as desired; however, the V-shape is preferred from the standpoint of strength.

The rolls 8 and 9 are provided with a temperature adjusting means utilizing the heat medium circulation and are also provided with a position control mechanism for controlling the gap formed between the rolls provided in combination. Corrugated rolls 8 and 9 are independently driven counterwise, and corrugated roll 9 is provided with a speed control device and adapted to rotate at a peripheral speed 1 to 20 percent greater than that of corrugated roll 8, thereby providing tension to the corrugated core sheet 4 so as to prevent lifting or separating of said sheet from corrugated roll 9 and to make the temperature of the core sheet uniform with roll 9 thus preventing distortion of the corrugation of the sheet due to uneven shrinkage of the core sheet owing to a differentiated temperature distribution therein. The aforementioned controlled speed should be sufficient to prevent separation of the corrugated core sheet although excessively great speed is not preferred, because this would tend to force the corrugated rolls to rotate in cooperation with each other and mechanical difficulties in driving corrugated roll 8 would arise in addition corrugated core sheet 4 might be subjected to elongation, thus resulting in distortion of the corrugated board due to the residual stress therein.

The corrugated sheet 4 is drawn by roll 9 having a corrugated surface, and a flat sheet 5 extruded from flat sheet die 2 is then laid from above on said corrugated core sheet 4 whose configuration is maintained as formed by the gap provided by the combination of rolls 8 and 9, while said sheet 4 is maintained in contact with the surface of roll 9. The flat sheet 5 is laid on the corrugated core sheet 4 and is in a plastic condition immediately after being extruded from die 2 and press-adhered in such a plastic condition by means of cool air being blown from air blowing means 11. The air blowing means is of a construction which permits the lip gap to be adjusted to 0-3 mm and is adapted to move vertically and to rotate, thereby further permitting controls for the air blown position of the roll and the direction of the air being blown.

In this manner, flat sheet 5 and corrugated core sheet 4 are integrally adhered together on roll 9 having a corrugated surface by means of gravity and of tension in flat sheet 5 in addition to the pressure of the air applied. During this time, corrugated core sheet 4 is retained on corrugated roll 9, thereby incurring no distortion to the corrugation.

Furthermore, since flat sheet die 2 is located above corrugated roll 9, the air gap (between the tip of the die to a contact point of the sheet with the roll) can be made small, so that flat sheet 5 may be maintained in a plastic condition, thereby providing greater adhesion strength for the combination of corrugated core sheet 4 and a flat sheet 5. When single-face corrugated board is formed by adhering corrugated core sheet 4 to flat sheet 5, it would be necessary to maintain the temperature of the board lower to prevent distortion of corrugated core sheet 4 even at a point where the single-face board runs apart from corrugated roll 9. On the other hand, it is advantageous to maintain the temperature of the board higher to insure a sufficient adhesion between corrugated sheet 4 and flat sheet 5, while the corrugated core sheet 4 is maintained in contact with corrugate surfaced roll 9 for adhesion.

In view of these two conflicting conditions, there should be established an optimum temperature range which depends on the type of thermoplastic resin, the forming speed and the thickness of the sheet. When a polyolefin is used, the temperature should range from 80° to 140°C, and when the adhesion time is shorter, then the temperature should be held lower, whereas when the adhesion time is longer, the temperature should be maintained higher. The temperature of the single-face corrugated board is primarily controlled by controlling the temperature of corrugated rolls 8 and 9 and secondarily affected by the temperature and flow rate of the air jet. The touch rolls 7 and 7' are provided as the auxiliary temperature controlling means to facilitate the above temperature control at rolls 8 and 9, thereby minimizing the temperature difference between the two rolls and causing thermal expansion to be uniform and maintaining constant the gap formed therebetween. Furthermore, the contraction rate of flat sheet 5 can be controlled by adjusting the temperature and flow rate of the air being blown, and distortion of the corrugated board in the width and drawing directions can be corrected and the flatness thereof may be improved with the aid of control over contraction of flat sheet 6 by means of air blown from air blowing means 12 which will be referred to hereinafter.

The single-face corrugated board thus formed is then directed from corrugated roll 9 to joining flat roll 10 so that the face of the board comes into contact with the surface roll 10.

A flat sheet 6 extruded from flat sheet die 3 of the extruder provided above flat roll 10 is then laid on the corrugated core sheet 4, now in the form of a single-face corrugated board on the surface of flat roll 10 and then press-adhered together by means of the air jet from air blowing means 12, thereby providing a double-face corrugated board. Flat roll 10 is provided with a heat medium circulating means and another mechanism adapted to cooperate with the corrugated roll 9 and keep the two rolls 9 and 10 at the same peripheral speed. The air blowing means 12 is similar to means 11. The condition under which the corrugated core sheet 4 is adhered to flat sheet 6 is adjusted in the same manner as in the case with adhesion of the corrugated core sheet 4 to flat sheet 5. The temperature of the single-face corrugated board is maintained somewhat lower than in the case of adhesion of sheet 4 to sheet 5 and the corrugated core is supported at one side with a flat face. Therefore, at this stage, substantial distorsion of the corrugation does not occur, although the corrugated core sheet is not supported over the entire surface of the corrugation as with corrugate-surfaced roll 9. Again, the contraction rate of flat sheet 6 is controlled by adjusting the air jet from the air blowing means 12.

The double-face corrugated board is then drawn by pinch rolls 15 and 15' via guide roll 14. The pinch rolls 15 and 15' are provided with means to increase the peripheral speed thereof within the range of 1 to 10% with respect to that of flat roll 10.

The double-face corrugated board which has been released from the flat roll 10, as has been described hereinabove, is corrected of distortion by means of air blowing means 11 and 12 and in turn is corrected of any residual distortion by means of cooling means 13 and 13'. The cooling means may be either of a type of cooler having a plurality of air blowing and drawing devices in turn, or of a flat plate type of cooler adapted to circulate a heating medium such as water therein, thereby permitting independent adjustment of the temperature and flow rate of the air jets or heating medium.

Thus the faces of the double-face corrugated board are cooled separately, the one confronting the cooling means 13 being cooled quicker than that confronting the other cooling means 13', thereby flattening curving of the corrugated board, said curving being imparted according to the curvature of roll 10. For this purpose, however, it is preferable to separate the cooling means 13 and 13' into several segments extending along the direction of drawing of the board and that the temperature of the segments thus formed be controlled independently. However, the curving of the corrugated board could not be corrected or flattened, unless the cooling is effected at a position where solidification of the corrugated board has not been completed.

With the production of single-face corrugated board, means 3, 10 and 12 may be omitted and said corrugated board may be corrected to flatness by passing the same through cooling means 13 and 13' at a point apart from the corrugated roll 9.

Alternatively, the flat sheet dies 1, 2 and 3 may be connected to one extruder but may also be connected to two or three extruders. The use of plural extruders pemits not only an increase in forming speed, but also the use of varying types or colors of resins for the corrugated core sheet and liners.

The process according to the present invention can be applied to all kinds of thermoplastic resins utilizable as sheet materials and particularly to polyolefins having a tendency to cause greater die swelling, thereby providing plastic corrugated board having a well-regulated corrugation configuration, flatness and a great adhesion strength. One preferred thermoplastic resin is a crystalline polymer of propylene base.

As various changes could be made in the above constructions without departing from the scope of the invention, it is intended that all matters contained in the above description or shown in the accompanying drawing shall be interpreted as illustrative and not in a limiting sense.

What is claimed is:

1. A process for producing a corrugated board of a thermoplastic resin which comprises:
    1. extruding said thermoplastic resin to form a first flat sheet;
    2. passing said first flat sheet through a gap formed between a pair of corrugating rolls having corrugated surfaces to form a corrugated core sheet having corrugations extending parallel to the direction of passage of said core sheet between said corrugating rolls;
    3. maintaining one of said corrugating rolls carrying said corrugated core sheet at a peripheral speed from 1 to 20 percent higher than that of the other of said corrugating rolls to provide tension to said corrugated core sheet;
    4. extruding a second flat sheet of thermoplastic resin;
    5. laying said second flat sheet on said corrugated core sheet from above while said corrugated core sheet is retained on said corrugating roll having the higher peripheral speed;
    6. press-adhering said second flat sheet to said corrugated core sheet to form a single-face corrugated board while said second flat sheet is at a sufficiently high temperature to maintain it in the plastic state and said corrugated core sheet is at a sufficiently high temperature to effect adhering, said press-adhering being completed by the weight of said second flat sheet and the tension therein in addition to the pressure of cool air blown onto said second flat sheet; and
    7. cooling both sides of said single-face corrugated board separately and under tension thereby correcting curving and improving the flatness thereof.

2. The process as defined in claim 1 which includes the step of adjusting the temperature of said first flat sheet prior to being corrugated by contact with touch rolls and varying the angle of contact thereof with said touch rolls.

3. A process for producing a corrugated board of a thermoplastic resin which comprises:
    1. extruding said thermoplastic resin to form a first flat sheet;
    2. passing said first flat sheet through a gap formed between a pair of corrugating rolls having corrugated surfaces to form a corrugated core sheet having corrugations extending parallel to the direction of passage of said core sheet between said corrugating rolls;
    3. maintaining one of said corrugating rolls carrying said corrugated core sheet at a peripheral speed from 1 to 20 percent higher than that of the other of said corrugating rolls to provide tension to said corrugated core sheet;
    4. extruding a second flat sheet of thermoplastic resin;
    5. laying said second flat sheet on said corrugated core sheet from above while said corrugated core sheet is retained on said corrugating roll having the higher peripheral speed;
    6. press-adhering said second flat sheet to said corrugated core sheet to form a single-face corrugated board while said second flat sheet is at a sufficiently high temperature to maintain it in the plastic state and said corrugated core sheet is at a sufficiently high temperature to effect adhering, said press-adhering being completed by the weight of said second flat sheet and the tension therein in addition to the pressure of cool air blown onto said second flat sheet;
    7. directing said single-face corrugated board around a flat roll with said second flat sheet in contact with said flat roll;
    8. extruding a third flat sheet of thermoplastic resin;
    9. laying said third flat sheet on said single-face corrugated board while retained on said flat roll;
    10. press-adhering said third flat sheet to said corrugated core sheet to form a double-face corrugated board while said third flat sheet is at a sufficiently high temperature to maintain it in the plastic state and said corrugated core sheet is at a sufficiently high temperature to effect adhering said press-adhering being completed by the weight of said third flat sheet and the tension therein in addition to the pressure of cool air blown onto said third flat sheet; and
    11. cooling both sides of said double-face corrugated board separately under tension thereby correcting curving and improving the flatness thereof.

4. The process as defined in claim 3 which includes the step of varying the cooling speeds on said both sides of said double-face board.

5. The process as defined in claim 3 wherein the formation of said corrugated core sheet and the adhesion of said core sheet to said second and third flat sheets is carried out at a temperature of from 80° to 140°C. and the thermoplastic resin is a crystalline polymer of propylene basis.

6. The process as defined in claim 3 wherein the double-face corrugated board is drawn by take up means and said cooling is conducted while maintaining the double-face corrugated board under tension, said take up means having a peripheral speed of from 1 to 10 percent greater than that of said flat roll.

7. The process as defined in claim 3 which includes the step of adjusting the temperature of said first flat sheet prior to being corrugated by contact with touch rolls and varying the angle of contact thereof with said touch rolls.

8. An apparatus for producing a double-face corrugated board of a thermoplastic resin which comprises:
1. a first flat sheet die adapted to extrude a thermoplastic resin to form a first flat sheet;
2. a pair of touch rolls operatively associated with and located below said first flat sheet die for receiving said first flat sheet and provided with means for cooling said first flat sheet and with means for varying the contacting angle of said first flat sheet with said rolls;
3. a pair of independently driven counter rotatable corrugating rolls adapted to form said first flat sheet into a corrugated core sheet, said pair of rolls consisting of a first roll having a corrugated surface operatively associated with and located below said touch rolls for receiving said first flat sheet and a second roll having a corrugated surface, said rolls having plural corrugations on their peripheries extending normal to the axes of said rolls, and being separated from one another to form a gap having a configuration accommodating the configuration of the formed corrugated core sheet, said rolls being provided with temperature adjusting means and a speed control mechanism causing said second roll to rotate at a peripheral speed of from 1 to 20 percent higher than that of said first roll;
4. a second flat sheet die operatively associated with and located above said second corrugating roll and adapted to extrude a thermoplastic resin to form a second flat sheet and to lay said second flat sheet into the formed corrugated core sheet carried on said second corrugating roll;
5. a first air blowing means being adjacent to said second corrugating roll and provided with means to adjust the air temperature, air flow rate and direction of the air blown to press-adhere said second flat sheet to the corrugated core and form a single-face corrugated board;
6. a flat roll provided with temperature adjusting means operatively associated with and adapted to rotate at the same peripheral speed and counterwise to said second corrugating roll to receive said single-face corrugated board with the single flat face thereof being in contact with the surface of said flat roll;
7. a third flat sheet die operatively associated with and located above said flat roll and adapted to extrude a thermoplastic resin to form a third flat sheet and to lay said third flat sheet onto the single-face corrugated board carried on said flat roll;
8. a second air blowing means being adjacent to said flat roll and provided with means to adjust the air temperature, air flow rate and direction of the air blown to press-adhere said third flat sheet to the single-face corrugated board to form said double-face corrugated board;
9. means for drawing the produced corrugated board from said flat roll; and
10. cooling means arranged in opposed relation and intercepting therebetween the produced corrugated board at a position apart from said flat roll.

9. The apparatus as defined in claim 8 wherein said cooling means which is arranged in opposed relation to the produced corrugated board is a pair of cooling means each divided into plural segments and provided with an independent temperature adjusting mechanism.

10. The apparatus as defined in claim 8 wherein said first, second and third flat sheet dies are connected to a single extruder.

* * * * *